US007061428B1

(12) United States Patent
Amir et al.

(10) Patent No.: US 7,061,428 B1
(45) Date of Patent: Jun. 13, 2006

(54) FREQUENCY HOPPING RANGE ESTIMATION WITH LOW POWER CONSUMPTION

(75) Inventors: Israel Amir, Princeton, NJ (US); Ari Naim, Englewood, NJ (US)

(73) Assignee: Remote Play, Inc., Englewood, NJ (US)

( * ) Notice: Subject to any disclaimer, the term of this patent is extended or adjusted under 35 U.S.C. 154(b) by 0 days.

(21) Appl. No.: 10/902,227

(22) Filed: Jul. 29, 2004

(51) Int. Cl.
*G01S 3/02* (2006.01)

(52) U.S. Cl. .................. 342/458; 342/129; 342/131

(58) Field of Classification Search ............... 342/129, 342/131, 132, 450, 458
See application file for complete search history.

(56) References Cited

U.S. PATENT DOCUMENTS 4,396,268 A * 8/1983 Shenk ..................... 396/105
4,551,825 A * 11/1985 Biber ..................... 367/101
4,554,668 A * 11/1985 Deman et al. ............... 375/133
5,757,308 A * 5/1998 Lissel et al. ................ 342/70
6,710,719 B1 * 3/2004 Jones et al. ............ 340/825.49

* cited by examiner

*Primary Examiner*—Dao L. Phan
(74) *Attorney, Agent, or Firm*—Henry T. Brendzel (57) ABSTRACT

An arrangement comprising a master unit and one or more slave units, where the master sends out bursts, at specified intervals, in a frequency hopping manner, with each burst being at a different frequency. The slave responds with acknowledgements, and the signal strengths of the acknowledgments are used to select one or more of the acknowledgments as the signals used for distance, or range, estimation. Advantageously, the durations of the intervals are fairly long during normal operation, and short at times when certain conditions occur, such as loss of communication or when accurate range estimation is required. Also, the slave is adapted to sleep while it is not expecting a burst transmission from the master, thereby saving power. The frequency hopping sequencing is preferably pseudo random, with a different sequencing of the same set of frequencies at different modes of operation.

41 Claims, 3 Drawing Sheets

B = USER INTERFACE

*FIG. 3*

FIG. 4

FREQUENCY HOPPING RANGE ESTIMATION WITH LOW POWER CONSUMPTION

TECHNICAL FIELD

This invention relates to systems for locating humans and objects. More particularly, the invention relates to estimation of distance between a transmitting unit and a receiving unit using RF signal strength, and to methods to achieve this estimation quickly and with low power consumption

BACKGROUND INFORMATION

The most popular methods for ascertaining location of objects involve Global Positioning System (GPS) of earth-orbiting satellites. A receiver within a GPS positioning system receives signals from a number of satellites, and through processing of the satellites' signals that involve "triangulation," the receiver is able to determine its position on the earth's surface with a great deal of accuracy. The degree of accuracy depends on the number of satellite signals that the receiver receives. The system is extensively used for navigation, and for locating humans. For human-locating applications, the GPS receiver typically includes a conventional radio transceiver that communicates to the base station the location that the GPS receiver has identified.

There are a few shortcomings to using GPS for locating of objects. Firstly, GPS does not work well indoors. Often the satellite signals do not penetrate through the building roofs, especially when those are made out of either brick or stone, and thus the receiver gets only few signals that are of sufficient strength to be usefull. Furthermore, even when the satellite signals do penetrate the building roofs, the accuracy of position estimation deteriorates significantly (30–100 feet). Applications that need better range accuracy thus have a problem. Secondly, GPS receivers take up to 30 seconds to initialize (before a reading can be obtained), unless they are continuously "on," which is undesirable in small portable devices where battery life is an important factor. When it is continuously "on," its power consumption is high and that limits performance and impacts price. Third, GPS receivers that hare sensitive enough to provide good accuracy are expensive.

Systems that employ RF signals and, more particularly, that employ the strength of a received RF signal to estimate the location of an object that emits the RF signal have also been proposed. Basically, the idea of these systems is to estimate the distance of the RF signal-transmitting source based on the strength of the received signal. However, when implementing such a system as a consumer product, it is highly desirable to employ a frequency band that does not require specific licensing, and that effectively means using one of the "free" frequency bands. In most cases, the transmitted power in such bands is limited by FCC Rules (in the US). Those Rules permit higher-power to be transmitted in the ISM bands, if spread spectrum is used. The simplest method to achieve spread spectrum is through frequency hopping.

US Patent application US2004/0039521 suggests the use of frequency hopping to increase the security of a child locating system. More specifically this application suggests that both the monitored station and the monitoring station have an algorithm that a seed should be sent by the monitoring station to the monitored station, and that this seed will cause both the monitored and the monitoring station to be synchronized to a common pattern of frequencies, in a frequency-hopping manner. Although an algorithm is mentioned, the only embodiment described is a table of frequencies, and presumably the communicated seed dictates the pattern of accessing the table.

US Patent application US2004/0036597 teaches another method, where security of the system is improved by using what it calls "rolling" identification codes that are continuously changing.

The above systems, like all other RF proximity detection system, are based on the same basic physical law that governs electromagnetic fields, where the signal strength decays in generally a known and predictable manner; i.e., in an inversely proportional to the distance, squared. Unfortunately, this is valid only for free space propagation and, in most practical cases that is not the case. Consequently, the received RF signal strength does not appear to strictly obey the above law. For example, multipath effects cause the received signal to significantly fluctuate. Often one would receive stronger signals for larger distances. In fact, in closed environment, the signal strength can fluctuate to the point that a method that is based strictly on the signal strength of a given received signal would be deemed useless. The problem of multipath effect is even more severe when the line of sight is obstructed (or partially obstructed—near line of sight) because in such cases the received signal is mainly a composite of reflected and refracted signals with substantially arbitrary signal strengths.

The main problem however, of utilizing such systems, is the inherent inaccuracy of RF signal strength as a base for range measurements, and none of the above-mentioned applications address, or even recognize, this problem

SUMMARY OF INVENTION

The problem of multipath effects is at least partially solved, and an advance in the art is realized by employing a plurality of measurements, at different frequencies, from which an estimate of distance is computed. The arrangement contemplates a master unit and one or more slave units, where the master sends out bursts, at specified intervals—which define a mode of operation—, in a frequency hopping manner, with each burst being at a different frequency. The slave responds with acknowledgements, and the signal strengths of the acknowledgments are used to select one or more of the acknowledgments as the signals used for distance, or range, estimation. Advantageously, the mode of operation is controlled by the master unit to operate with fairly long intervals during normal operation, and short intervals at times when certain conditions occur, such as loss of communication or when accurate range estimation is required. Also, the slave is adapted to sleep while it is not expecting a burst transmission from the master, thereby saving power. The frequency hopping sequencing is preferably pseudo random, with a different sequencing of the same set of frequencies at different modes of operation.

DETAIL DESCRIPTION OF THE INVENTION

DETAILED DESCRIPTION

Figure 1:
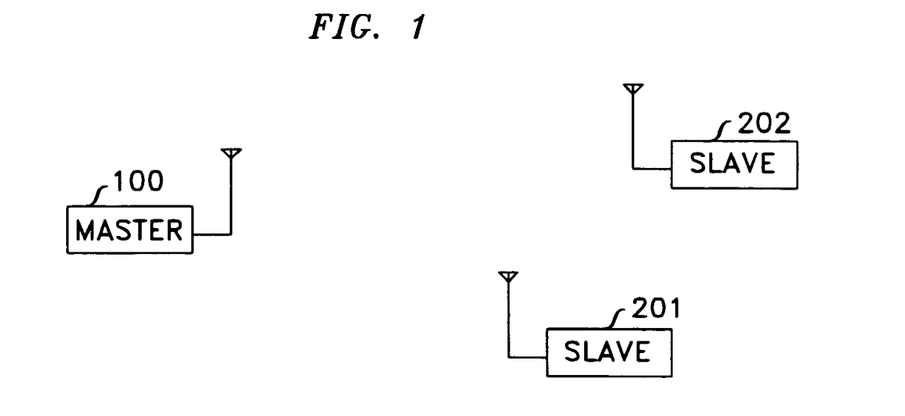
FIG. 1 depicts a master and slaves arrangement.

FIG. 1 shows a monitoring unit 100 (master unit) and monitored units 201 and 202 (slave units). There can be any number of slave units, but for sake of exposition simplicity, FIG. 1 shows only two. The slave units may be identical to each other, except for some installed parameters, such as unit ID, or system ID. Some embodiments might have the parameters installed permanently, and other embodiments might have the parameters (or at least some of them) be alterable. The basic structure of the master and slave units illustrated in FIG. 1 is not unlike that of conventional transceivers, in the sense that both have transmitter portions, receiver portions, antennas, and a power source. They are unique, of course, relative to the means and the method of operation that are described herein.

The mode of operation of the FIG. 1 arrangement is that of repeated polling. The master sends out a burst that is addressed to a particular slave unit, the slave unit responds with an acknowledgment burst, and some time later the master unit sends out another burst. When interacting with a number of slave units such as depicted in FIG. 1, time division multiplexing is employed. That is, the master unit addresses a burst first to slave unit 201, then to slave unit 202, then to other slave units (not shown), and when all of the slave units have been addressed, the master unit returns to addressing slave unit 201. In another embodiment, the Master sends a single burst targeted to all slaves and each slave answers in its predetermined time slot. This arrangements saves power as fewer transmission bursts are needed by the master.

The format of what each burst contains is a design choice. Illustratively, the burst transmitted by the FIG. 1 master unit comprises a modulated carrier that, illustratively, carries 128 bits made up of a 32-bit preamble field followed by a 32-bit data field, which is followed by two more data fields that carry the identical data for "2 out of 3" majority voting. The 32 bit data field (4 bytes) is structured as follows:

1. The first four bits of the first byte specify the slave ID, which allows a system to operate with up to 15 slaves. The 0 address is reserved for broadcasting. That is, all slave units accept the address 0 as belonging to a polling message that is addressed to them.
2. The second four bits of the first byte define the session ID.
3. The second byte is the command byte, comprising an ACK bit followed by 7-bit bits that specify a command. An ACK bit of value "1" acknowledges receipt of the previous burst. This is useful in situations where it is important for a slave unit to affirmatively know that its response message—which might contain a distress indication, of example—was received by the master unit.
4. The third byte is a data byte. This allows various commands to include associated data. This field is at the minimum 1-byte. It is noted that this field can be expanded to transmit more data.
5. The fourth byte is a redundancy check byte that contains the bit-wise XOR of the three other corresponding bytes in the basic structures.

As indicated above, use of a frequency-hopping mode of operation is particularly advantageous when operating in the ISM band and, accordingly, at least partly because the FIG. 1 arrangement operates in the ISM band, the mode of operation in the FIG. 1 arrangement is that of frequency hopping. That is, while communicating with each other, and unit 100 repeatedly transmits bursts, each burst may be at a different carrier frequency, and the sequence of frequencies of the transmitted bursts follows a preselected algorithm that yields, in the FIG. 1 arrangement, a pseudorandom sequence of, for example, 31 different frequencies.

Of course, a slave, such as unit 201, needs to be synchronized to the master, at least in the sense that it needs to traverse the same sequence of frequencies that the master follows, and there are numerous methods by which it can be arranged for the master unit and the slave unit to follow the same sequence of frequencies. The simplest is to employ a pseudorandom sequence that is pre-set during manufacture of both the master and all of the slave units. Another is to have the master and the slave units manufactured with a number of embedded sequences, and the user selects one—not unlike users selecting a code for garage door openers. Yet another way is to have the master and slave have a setup mode during which the master sends information to the slave that enables the slave to create a pseudorandom sequence that is identical to the sequence that the master creates. For example, a pseudorandom sequence can be created with a shift register of length n, and a particular Exclusive-OR feedback. Hence, the master and slave can create the same pseudorandom sequence as the master, by the master sending to the salve the value of n and a specification of the feedback arrangement. It is noted that a pseudorandom sequence of length $2^n-1$ can be created for any specific seed of length n.

Sharing a common sequence of frequencies is, of course, not enough because the master and slave units must also be synchronized to each other in the sense that they must be in the same spot of the sequence; i.e., the frequency at which the master is transmitting must be the frequency to which the slave's receiver must be tuned. A preferable mode of operation is to have the power turned off to all of the slave's circuitry, but for a gating circuit that is powered continually and which turns the power on for the rest of the slave's circuitry only at specified times, and for a specified duration that is timed to coincide with expected reception of a burst from the mater unit. Likewise, the Master can power off its circuitry between bursts. In such an embodiment, an additional synchronization requirement exists, and that is the synchronization of when the gating circuit opens the window.

Figure 2:
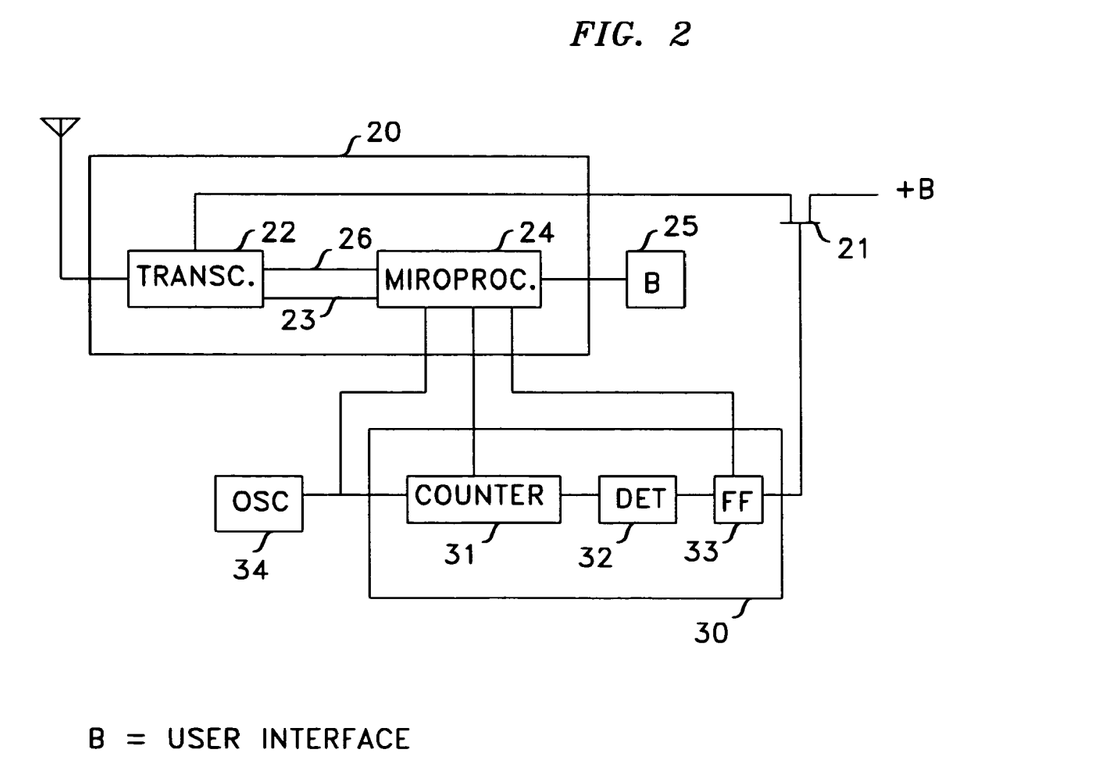
FIG. 2 presents a block diagram of a slave unit in accord with the principles disclosed herein.

A block diagram of slave unit 201 is illustrated in FIG. 2. It includes a transceiver section 20, and a gating section that includes circuit 30 and gate 21. The basic mode of operation is that gate 21 provides power for section 20, until microprocessor 24 within section 20 decides that it has accomplished its processing tasks, whereupon it presets a number into counter 31, and turns power off to section 20 by setting flip-flop 33 (which controls gate 21). Counter 31 is continually advanced (incremented or decremented) by oscillator 34 until it reaches a value that causes detector 32 to reset flip-flop 33, which turns power back on to section 20, and microprocessor 24 enters another processing cycle. Oscillator 34 is also applied to microprocessor 24 to trigger advances in the stepping through the frequency sequencing that microprocessor 24 carries out, as described more fully below (except when the advancing through the frequencies sequence is disabled). Microprocessor 24 includes a processing clock that is much faster than oscillator 34 and, advantageously, oscillator 34 may be derived from the processing clock.

When processing, microprocessor 24 specifies to transceiver unit 22 the frequency it should be tuned to, and accepts a digital signal corresponding to the received signal. The algorithm for determining this frequency is described in more detail below.

Microprocessor 24 then processes received signal and applies it to user interface circuit 25. User interface circuit may determine to send some information to master unit 100, in which case it provides the information to microprocessor 24. Whether or not information is provided by circuit 25, microprocessor 24 develops a response message for master unit 100, and directs transceiver 22 to output a burst at a specified frequency. It then performs its algorithm for determining what next frequency is to which it should be tuned, and the duration of the sleep interval (which translates to a number X to be installed in counter 31). Lastly, microprocessor 24 installs the determined valued into count 31, and sets flip-flop 33 to cause it to turn off power to section 20. For sake of simplicity of exposition, the following assumes the counter 31 is decremented, and that detector 32 detects the value 0. Consequently, larger values of X represent longer sleep intervals.

Figure 3:
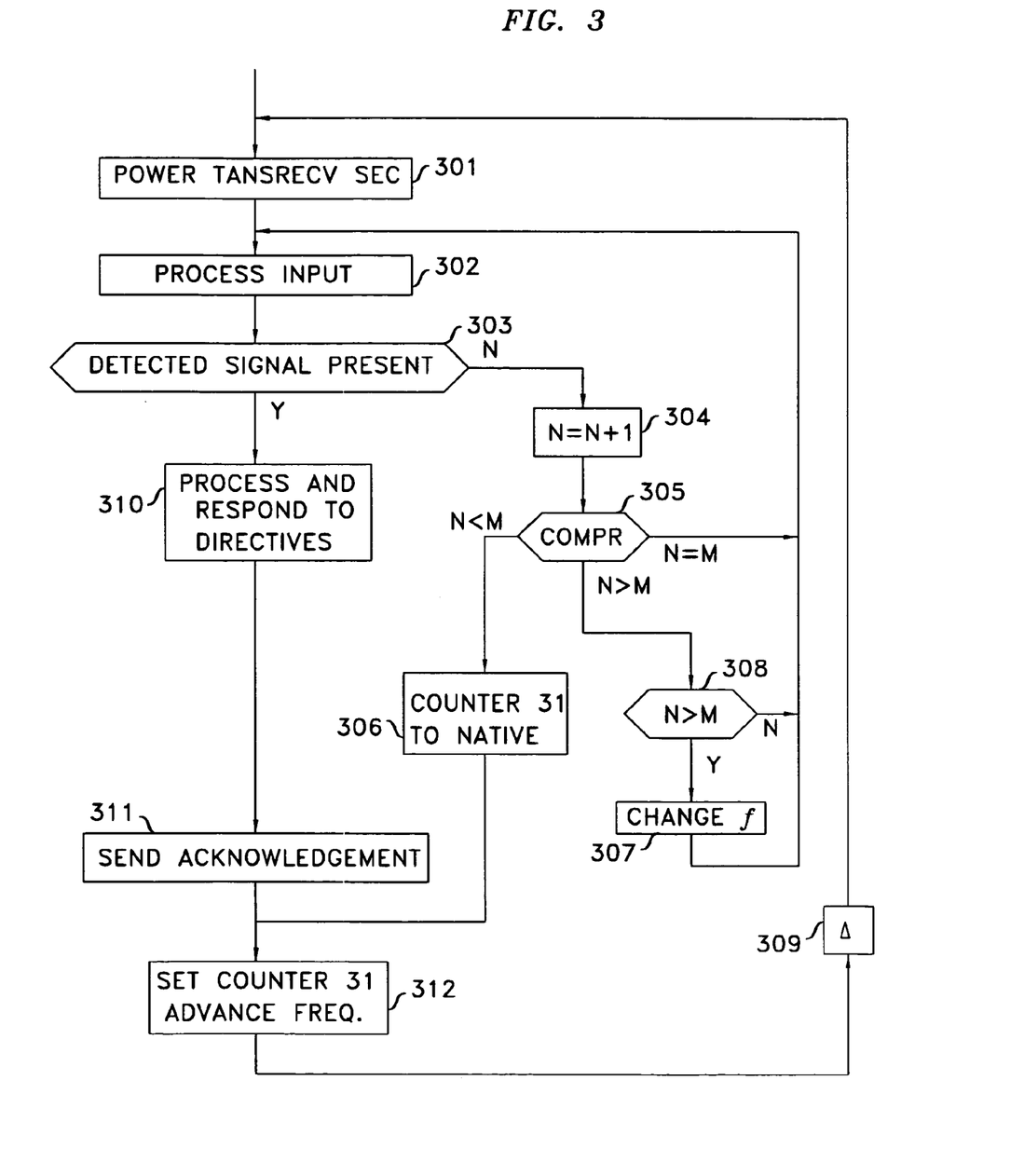
FIG. 3 presents a flow diagram of processing performed in the slave microprocessor 24 of FIG. 2.

FIG. 3 presents a flowchart of one operational aspect of a slave unit in the FIG. 1 arrangement; to wit, the synchronization process. It is assumed that the slave unit is just turned on (and gate 21 applies power to section 20), processor 24 randomly has selected a frequency to which transceiver 22 is tuned, and the number X within processor 24 is at some random number. Additionally, no information is available as to when master unit 100 transmits its bursts. In other words, slave unit 201 is not synchronized as to time, and not synchronized as to frequency.

The FIG. 3 flowchart handles this condition as part of its normal routine, as follows.

When detector 32 resets flip-flop 33 and causes the power to turn on for section 20, the process begins with step 301. Whatever signal is received by transceiver 22 passes to processor 24, and processor 24 determines whether a bona fide signal was detected, or merely noise (or a signal from another transceiver system). This corresponds to steps 302 and 303 in FIG. 3. While the slave unit is synchronized neither in frequency nor in time, the chances are great that no bona fide signal is detected, and control passes to step 304, where a variable N is incremented by 1 (presumably from 0). Control then passes to step 305, which ascertains whether variable N is greater than preselected threshold M. The threshold M effectively distinguishes between the slave failing to receive a bona fide signal because of miscommunication with the master in the course of a going session, such as when the master unexpectedly (from the slave's perspective) enters the Native mode, and the slave failing to receive a bona fide signal because of a total lack of synchronization.

While N is less than M, control passes to step 306, which sets X to a predetermined minimum value (corresponding to a preselected short sleep interval, which is the Native mode), and passes control to step 312, which installs the value of X into counter 31 and sets flip-flop 33. Control then passes to step 309, which represents the sleep interval until oscillator 34 decrements counter 31 to 0, and flip-flop 33 is reset.

On initial turn-on of the slave unit, the cycling through steps 301, 302, 303, 304, 305, 306, 312 and 309 continues until either a valid reception is detected by step 303, or until N becomes equal to M.

On initial turn-on, the former is unlikely so when the latter condition occurs, control passes to step 308, which effectively concludes that the slave unit is not synchronized, disables the advancing of frequency advances returns control to step 302. Since the process flow now skips steps 312 and 309, the effect is that section 20 of slave unit 201 is powered on continuously. This eliminates the sleep period and the consequent sensitivity to reception timing. The action of step 308 eliminates the sensitivity to frequency because transceiver 22 is not effectively parked at one of the frequencies from the sequence of frequencies that microprocessor 24 employs.

Having returned to steps 302 and 303, a determination is again made as to whether a bona fide signal has been received. While a bona fide signal is not yet detected, control continues to be passed to step 304, where N is incremented to a value greater than M, and control passes to step 307, which ascertains whether N is greater than threshold K. As long as N is less than K, control returns to step 302. However, if some condition exists that effectively blocks communication at the frequency at which slave unit 201 is parked (for example, a particularly strong interference at that frequency) eventually the value of N becomes greater than K, and control passes to step 308, which causes microprocessor 24 to change the frequency at which slave unit 201 is parked, and returns control to step 302.

Eventually, a bona fide signal is detected. Among other things, this signal specifies to slave unit 201 the particular sequence of frequencies that master unit 100 is employing. Control passes from step 303 to step 310, where the disablement of advancing the frequency to which transceiver 22 operates is removed, N is reset to 0, and X is set to the value specified in the received signal. Step 310 also processes whatever other directives are found in the received signal burst, and control passes to step 311.

Step 311 constructs an acknowledgement message, transmits this message in a burst, and passes control to step 312. Step 312 advances to a next frequency in the sequence of frequencies that microprocessor 24 uses, installs the value of X in counter 31, and resets flip-flop 33.

Thus, once the slave unit receives a valid signal, it synchronizes itself to the master, since it is provided with the value of X (the duration of the sleep interval), it is provided with information about the sequencing of frequencies, it's initial timing is set by the setting of counter 31 and resetting of flip-flop 33, and its startup frequency is known (it being the frequency at which the signal was received). Operation then continues with the master sending bursts, the slave listening at just the right time and frequency for a signal, detecting the signal, and sending an acknowledgment burst.

Should this operation be interrupted for some reason, for example when the slave unit moves to a physical spot where multipathing significantly reduces the magnitude of the received signal, the FIG. 3 illustrative process routes control through steps 304, 305, and 306, effectively switching slave unit 201 to Native mode operation. If the slave unit fails to receive a signal for M consecutive cycles, as indicated above, the slave assumes a complete synchronization failure and the process proceeds to re-establish synchronization, as described above.

In embodiments where master unit 100 is adapted to handle multiple slave units, the master can time-division-multiplex all of the slave units. Thus, for example, if the master wishes to transmit at a rate that is not higher that periodicity T second, and if there are L slaves, and M frequencies in the frequency-hopping set, then the repetition rate of the frequency hopping set within a slave is LMT seconds.

The above description of the FIG. 3 process already hints at modes of operation that are other than the Native mode. Indeed, in accord with the principles of this invention, the FIG. 1 arrangement is not constrained to operate in the Native mode, but is rather adapted to operate in slower modes that, advantageously, consume less power because during sleep periods a significantly lower power load is presented to the slave's battery. Different modes of operation are chosen based on the communication conditions between the master and the slave, and those different modes are achieved through the value of X, which as described above determines the duration of the sleep period. Regardless of the operational mode (i.e., the duration of the sleep period), the notion of pseudorandom sequencing of frequencies is maintained and, in accord with the principles disclosed herein, the same set of frequencies is employed regardless of the operational mode.

There are numerous ways to employ the same set of frequencies, independently of the mode of operation. One approach is to employ the same sequence of frequencies as in the Native mode, and simply employ a sub-harmonic repetition rate of the Native mode periodicity, T. That is, rather than sending out a burst every T seconds, the master might inform the slave unit that it will switch to periodicity of, for example, 15 T, and once the slave unit acknowledges, the master unit waits 15 T second before sending out the next burst at the frequency that follows in the sequence the frequency of the previously sent burst. This approach is problematic, however, when the communication between the master and slave are not perfect. If the slave loses its place in the sequence it would not know when to expect the next burst and will have to "fall" to the lengthy process of initial resynchronization.

According to the present invention, therefore, the slower operational mode does not employ the literally the same sequence of frequencies but, rather, algorithmically creates a frequency sequence that is based on the Native mode sequence and the selected sub-harmonic repetition rate of the Native mode periodicity, resulting in a sequence that effectively employs the same set of frequencies, but in a different order. Illustratively, a number P is selected that is prime relative to the number of frequencies that are in the Native mode sequence, N, and the slower repetition rate is set to PT seconds. The frequency sequencing is created by having each burst advance P positions in the ordinal position of the frequencies in sequence of the Native mode relative to the previous burst. For example, instead of following frequency $f_a^j$ (frequency a in ordinal position j of the sequence) with frequency $f_b^{j+1}$—which occurs in Native mode operation, the burst that follows is $f_c^{j+P}$. It is noted that the "relatively prime" requirement that is imposed on P insures that the resulting (modified) sequence of the slower mode of operation still maintains a sequence of the same number of different frequencies. That is not much of a restriction, however. For example, with 31 frequencies in the frequency hopping sequence, every number between 2 and 31 can be employed.

Actually, even longer-duration periods are possible by skipping one, or any number of complete cycles. That is, almost any long period can be obtained, and still have the same frequency hopping sequence length, as long as the desired periodicity T' modulo the sequence length (e.g., 31) is relatively prime to the sequence length.

It may be noted that this approach has an advantage in that the cycling of frequencies is totally independent of the mode of operation. The mode of operation controls only the times when the power is turned on in the slave, allowing it to receive, and to transmit.

The above-disclosed arrangement has the additional advantage of uncomplicated mode switching (from a first repetition rate to a second repetition rate). Specifically, while the master and the slave communicate in the Native mode, the master may decide to move to a slower mode of operation with, for example, period 15 T (where T is the period of a native mode cycle). In such a case, the transmitter sends a command to the slave to move to period 15 T operation. As soon as the master determines that the slave successfully received and executed the command; that is, moved to the 15 T periodicity, the master moves to the same periodicity, and the transfer of operation modes is completed. The master knows that the slave unit has moved off the Native mode when the slave does not respond at 2 T. The master affirmatively knows that the slave moved to 15 T periodicity when the master received the expected acknowledgement at 15 T.

When the master and slave are operating at other than a Native mode, for example, with periodicity of 15 T, and the master wishes to switch operation, for example to a periodicity of 23 T, the master sends a command to the slave informing the slave of the desired change and, as above, proceeds to transmit at both rates. When the master ascertains that the slave has moved to the new rate, the master stops transmitting at both the old rate and the new rate, and continues transmitting only at the new rate.

Recognizing that noise may cause a breakdown in communication between the master and the slave the design is robust enough to recover. Loss of communication may occur when the master sends a burst and an acknowledgment is not received even though the slave received the burst and sent out an acknowledgment (loss condition 1), or when the master sent a burst and an acknowledgment is not received because the slave did not receive the transmitted burst (loss condition 2). In loss condition 1 the slave executes steps 310 and 311 and, thus, moves to the next frequency in the sequence, whereas in loss condition 2 the slave reaches step 304, increments N to 1, and advances to step 306 where it moves to the next frequency in the sequence expecting to communicate with the next burst in the Native mode.

In accord with the principles disclosed herein upon failing to receive an acknowledgement the master changes its mode of operation to the Native mode, and sends the next burst to the slave with a directive to change its mode of operation to the Native mode. If this action resulted from loss condition 1, the slave had changed its frequency (in step 312) but not its mode of operation. Therefore, the slave will not respond until the master arrives at the time slot at which the slave is open to receive signals. Since the master unit operates at the Native mode, communication with reestablished in MT seconds, where M is the number of frequencies in the frequency hopping set of the sub-harmonic sequence. For example, if the longer duty cycle is comprised of transmission every 7 native mode cycles communication will be reestablished every 7 native mode cycles (or LMT seconds, if L slave units are in the system). It is important to note that using such subsequences create also sequences that are psuedo random and utilize the entire set of frequencies homogenously.

The above disclosed a mode of operation that allows slave units to operate with a very low duty cycle, except at the beginning of a session, or upon the occurrence of certain events, such as loss of communication. This results in a system that has very low power consumption because a good portion of the time the transmitters (of both the slave and the master units) are inactive.

What remains is to describe the range, or distance, estimation aspect of the FIG. 1 arrangement.

Clearly, each received acknowledgement burst from a slave is received with a certain signal power level, and that level constitutes information about the slave's distance to the master unit. That is, according to well-known laws of physics, in free space the received power is directly proportional to the transmitted power, and inversely proportional to the distance squared of the slave from the master. Since the transmission power of the slave is closely controlled (both in terms of absolute value, and variability) the remaining variable is that of distance, or range, of the slave from the master.

Of course, attenuation of the signal due to obstructions, and multi-path reception signals as traverse different paths, are a concern. We have concluded, however, that when a collection of received signals is available, particularly when the received signals are of different frequencies, the best estimation of distance between the transmitting slave unit and the receiving master unit is obtained by focusing on the largest signal in the collection. Accordingly, in accord with the principles disclosed herein, one approach for estimating range is for the master to proceed with a complete sequence of the frequency hopping sequence, select the slave acknowledgment that was received with the largest power level, and employ that level in a conventional range estimating calculation pursuant, illustratively, to equation $$P_{received}|_{db} = P_{transmitted}|_{db} - (36.6 + 20 \log(f \cdot d))$$

where f is the frequency in MHz and d is the distance in miles. This equation assumes antennas without gain. From the above equation, the distance d can be determined.

Other embodiments are, of course, also possible, some of which are disclosed by the following examples:

1. Identifying the K largest signals of a received sequence of acknowledgments (obviously, having different carrier frequencies), computing the K corresponding distances, and employing the average computed distance.

2. Identifying the K largest signals of a received sequence of acknowledgments (obviously, having different carrier frequencies), computing the K corresponding distances, and employing the median computed distance.

3. Identify the frequency that, over a window of S sequences, arrives with the largest average power, and employing that average power for calculating the distance. This S-sequence window would be a sliding window.

4. Identify the frequency that arrives with the largest power, and stay with that frequency over a selected number of sequences, even if the power of that frequency is not the largest. This is particularly useful when assessing whether the distance is changing with time. This method also conserves a bit of power in that the processing within processor 24 is reduced (no need to compute distance sometimes) and, there 5. Estimate the range with each frequency, and associate a confidence level with each estimate, where the confidence measure is related to the received power.

6. The methods in the above, except for (4), without frequency hopping or with combination of hopping and non hopping frequencies. This approach takes advantage of the variability in the received signal that is caused by the changes in positions of the master and slave in time.

As disclosed above, the FIG. 1 arrangement is adapted to work at different modes of operation, where each has a different sleep interval. The choice of the sleep interval can be related to the distance measurements. For example, when the FIG. 1 arrangement is implemented as a system for keeping track of a child who is wearing a slave unit as, for example, a bracelet, and the master unit is a base station at home, or a bracelet worn by a parent, it may be acceptable to receive an updated distance measurement every 10 seconds when the child is close by, but it might also be desirable to receive an updated distance measurement every 2 seconds when the child is close to some prespecified distance away.

The above-disclosed frequency hopping employs a different frequency with each and every burst. That is not a system requirement, however, and it is not even an FCC requirement for ISM band operation. Therefore, it should be realized that repeating the same frequency a number of times before advancing in the frequency-hopping sequence is within the spirit and scope of this invention.

It may also be noted that the acknowledgement sent by slaves is valuable, but not essential. One can have a system where the slave sounds a local alarm when it fails to receive a transmitter burst within a given time interval, or when a master's burst informs the slave unit that it is too far from the master unit. Of course, the distance calculation can also be performed in the slave unit, and optionally sent to the master unit. As suggested above, the master unit can employ a "sleep" interval arrangement not unlike the one depicted in FIG. 2. This is particularly useful when the master unit is small portable unit, for example, a bracelet, or a pager-like device.

Figure 4:
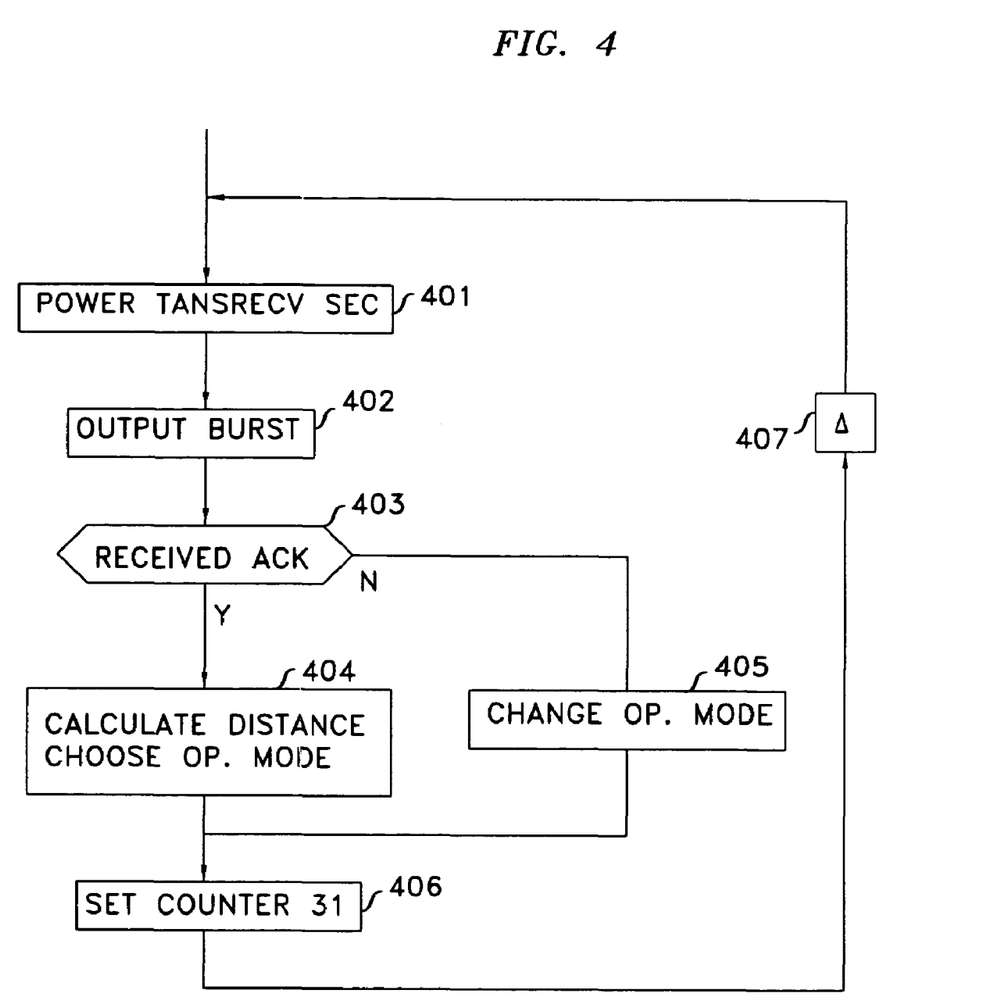
FIG. 4 presents a flow diagram of processing performed in the master unit.

It may be noted that the block diagram of master unit 100 can be essentially the same as the block diagram of slave unit 201. The process of master 100 is also quite similar to the process depicted in FIG. 3, as shown in FIG. 4. This flowchart assumes that master unit 100 includes sleep periods.

When power is applied to the microprocessor within unit 100 following a sleep period (step 401), the microprocessor constructs a polling message and transmits it (step 402). The message may include various bits of information, such as the address, or ID of the slave unit that the master wishes to respond (and ID of 0 indicates a broadcast asking all slave units to respond), the mode of operation that the transmitter wishes the slave unit(s) to adopt, information about the frequency sequence, alert information, etc. Control then passes to step 403 which places the master in a listening mode, waiting for an acknowledgement burst from the polled slave unit(s). When an acknowledgement message is received, control passes to step 404, which evaluated the message, computes a distance measure, as described above, and determines whether the mode of operation ought to be changed, and conditions itself to inform the slave units of such a change in the next-transmitted burst, if necessary. Control then passes to step 31, where the frequency of the transceiver within master unit 100 is changes, as described above, counter 31 is set in accord with the desired mode of operation, and power is disconnected to initiate a sleep period, which is represented by step 407. When an acknowledgment signal is not received by master unit 100, control passes from step 403 to step 405, wherein the mode of operation is changed in response to the failure to receive the acknowledgement signal.

Many features can be included in the FIG. 1 arrangement that relate to the user interactions with the system. To give but one example, when the arrangement operates in a power saving mode, the rate at which distance calculation updates arrive is fairly slow. A feature may be easily included where, with the push of a button, the master unit switches to the Native mode. Also, directionality can be imparted by having the master unit use two or more antennas that, for example, form a steerable array.

Thus, it should be clear that numerous modifications and additions can be implemented without departing from the spirit and scope of this invention, which is defined by the following claims.

The invention claimed is:

1. A method comprising the steps of:
receiving sets at a first unit, from a second unit, each set comprising a sequence of signal bursts, where at least some of the bursts in said sequence have different frequencies, where said second unit includes a transmitter;
computing, with each received set, a distance measure based on predetermined number of the received bursts; and
outputting the computed distance.

2. The method of claim 1 where each received set of bursts is in a processed response to a command transmitted by said first unit.

3. The method of claim 1 where the frequencies of burst in the sequence of a set form a pseudorandom sequence.

4. The method of claim 1 where the step of computing a distance is based only on one of the received bursts in each of said received sets.

5. The method of claim 1 where the step of computing, employs the same predetermined number of received bursts, at least when change in distance is considered.

6. The method of claim 4 where said one of the received signals is the burst in the received set having the largest received power relative to all other bursts of the set.

7. The method of claim 1 where the step of computing a distance is based on a preselected number of the bursts of a set that are received by said first unit that are characterized by a received power level that is higher than the power level of other bursts of said set that are received by said first unit.

8. The method of claim 7 where said distance measure is obtained by determining a distance based on each one of the preselected number of bursts, and selecting for outputting the median distance.

9. The method of claim 7 where said distance measure is obtained by determining a distance based on each one of the preselected number of bursts, and selecting for outputting an average distance determined from a number of distance measures obtained from each of said received sets.

10. The method of claim 1 where said distance measure is obtained by
identifying a frequency that over a window of S sequences, where S is a preselected number, arrives at said first unit with the largest average power; and
employing said largest average power to compute said distance measure.

11. The method of claim 10 where said steps of identifying and employing are executed with each sequence, thereby creating an S-sequence sliding window.

12. The method of claim 1 further comprising the steps of:
evaluating a measure of confidence in said distance measure; and
outputting said measure of confidence.

13. The method of claim 12 where said measure of confidence evaluation is related to received power of said predetermined number of the received burst on which said distance measure is based.

14. The method of claim 2 where said first unit transmits said bursts under influence of a burst enablement clock, where said burst enablement clock is controllably based on a native-mode clock, pursuant to a chosen mode of operation.

15. The method of claim 14 where, at least until said first unit receives a responsive burst from said second unit, said first unit causes said clock to be at a highest preselected rate.

16. The method of claim 15 where each burst from said second unit is at a frequency that is nominally the same as the frequency of the burst from said first unit to which the burst from said second unit is responsive.

17. The method of claim 2 where
said bursts of said first unit are created with carrier frequencies that are specified by a frequencies generator element within said first unit that creates a sequence of frequencies (FGen1),
said bursts of said second unit are created with carrier frequencies that are specified by a frequencies generator element within said second unit that creates a sequence of frequencies (FGen2), and
the sequence of frequencies generated by said FGen1 is the same as the sequence of frequencies generated by said FGen2.

18. The method of claim 17 where said FGen1 creates its sequence of frequencies under control of a native clock (NM1 clock), and said FGen2 creates its sequence of frequencies under control of a native clock (NM2 clock) that is nominally the same frequency as NM1 clock.

19. The method of claim 18 where:
said first unit transmits its bursts under influence of a burst enablement clock (BE1 clock),
said burst enablement clock is controllably based on NM1 clock,
said FGen1 advances to a next frequency in its sequence with each cycle of said NM1 clock, and
said second unit transmits its bursts under influence of a burst enablement clock (BE2 clock).

20. The method of claim 19 where said FGen2 advances to a next frequency in its sequence with each cycle of said NM2 clock, unless prevented from advancing by a control signal developed in said second unit.

21. The method of claim 19 further comprising the step of synchronizing said FGen1 to FGen2 by arresting advance of FGen2 to a next frequency in its sequence with a control signal, or by shifting FGen2 to a different spot in its sequence, or both.

22. The method of claim 19 where said BE1 clock is set to said NM1 clock.

23. The method of claim 19 where said BE1 clock is set to have a period of K+nL periods of the NM1 clock, where L is the number of frequencies in said sequence of frequencies created by FGen1 element, K is an integer that is relatively prime to L, and n is an integer.

24. The method of claim 23 where said BE1 clock is set by said first unit based on signal strength of said predetermined number of received bursts.

25. The method of claim 23 where said BE1 clock is set by said first unit based on a control signal supplied by a user of said first unit.

26. The method of claim 23 where said BE1 is set to NM1 clock whenever a user of said first unit specifies a desire of higher rate of distance measuring repetitions.

27. The method of claim 23 where said BE1 is set to NM1 clock when said computed distance approaches a preselected value.

28. The method of claim 23 where said BE2 clock is set by said second unit in response to a determination of rate of BE1 clock from bursts received from the first unit.

29. A method comprising the steps of:
receiving, at a first unit, sets of burst sequences from a second unit, each burst in a sequence having a different frequency, where said second unit includes a transmitter;
handling the received sets in groups to compute, for each group of received sets, a distance; and
outputting the computed distance.

30. The method of claim 29 where each group comprises two consecutive ones of said sets, and with respect to a first burst sequence of the group, computing the distance based on a burst in said first burst sequence having the largest received power relative to all other bursts of the sequence; and with respect to the second burst sequence of the group, computing the distance based on said burst used in computing said distance from said first burst sequence of the group.

31. The method of claim 6 further comprising the steps of:
recomputing said distance measure by employing a burst in an immediately succeeding set of bursts received by said first unit of a frequency that is the same as the frequency of said burst in said sequence having said largest received power;
computing a rate of distance change, and displaying said rate of distance change.

32. The method of claim 31 where said displayed rate of change includes both magnitude and direction of distance change.

33. The method of claim 1 where said bursts received by said first unit include an identifier of said second unit and a command field.

34. The method of claim 33 further comprising a data field that is associated with said command field.

35. The method of claim 34 further comprising an error correction field.

36. The method of claim 1 where information in each of said bursts transmitted by said second unit is repeated within the burst three times, to provide redundancy.

37. The method of claim 2 where said command transmitted by said first unit includes a destination address field that specifies said second unit with particularity, or specifies a broadcast mode operation.

38. The method of claim 2 where time between bursts transmitted by said first unit is divided into time slots, and said second unit transmits its responsive burst in a prespecified one of the time slots.

39. The method of claim 38 where said bursts transmitted by said first unit include a destination address field that specifies said second unit with particularity, or specifies a broadcast mode operation.

40. The method of claim 39 where said second unit responds in said prespecified one of said time slots regardless of whether said destination address field specifies said second unit, or specifies a broadcast mode of operation.

41. The method of claim 40 where, when set to said broadcast mode of operation, said first mode is conditioned to receive bursts appearing at any one of said time slots.

* * * * *